US011919150B2

(12) United States Patent
Foland et al.

(10) Patent No.: US 11,919,150 B2
(45) Date of Patent: Mar. 5, 2024

(54) SECUREMENT APPARATUS AND METHOD OF USE

(71) Applicant: Muth Mirror Systems, LLC, Sheboygan, WI (US)

(72) Inventors: Jared L. Foland, Sheboygan Falls, WI (US); Nicholas W. Schmoldt, Manitowoc, WI (US); Jacob A. Klauck, Cleveland, WI (US)

(73) Assignee: Muth Mirror Systems, LLC, Sheboygan, WI (US)

( * ) Notice: Subject to any disclaimer, the term of this patent is extended or adjusted under 35 U.S.C. 154(b) by 453 days.

(21) Appl. No.: 17/301,765

(22) Filed: Apr. 14, 2021

(65) Prior Publication Data

US 2021/0323173 A1 Oct. 21, 2021

Related U.S. Application Data

(60) Provisional application No. 63/011,434, filed on Apr. 17, 2020.

(51) Int. Cl.
*B25J 15/06* (2006.01)
*B25J 9/16* (2006.01)

(52) U.S. Cl.
CPC ......... *B25J 15/0616* (2013.01); *B25J 9/1664* (2013.01)

(58) Field of Classification Search
None
See application file for complete search history.

(56) References Cited

U.S. PATENT DOCUMENTS

| 4,980,971 | A | 1/1991 | Bartschat et al. |
| 9,769,930 | B2 | 9/2017 | Vanderpuy |
| 10,457,345 | B2 | 10/2019 | Herrmann et al. |
| 10,647,005 | B2 | 5/2020 | Wagner et al. |
| 2007/0101933 | A1* | 5/2007 | Chappa ............... B05B 13/0442 118/620 |
| 2015/0099060 | A1* | 4/2015 | Brophy .................. C03C 17/00 427/535 |
| 2019/0366417 | A1* | 12/2019 | Dively ................... B21D 43/24 |
| 2020/0047331 | A1* | 2/2020 | Chitta ..................... B25J 13/08 |
| 2021/0197402 | A1* | 7/2021 | Jeremiah .............. B25J 15/0616 |
| 2021/0237260 | A1* | 8/2021 | Holopainen ........... B25J 9/0051 |

OTHER PUBLICATIONS

Search Report and Written Opinion for PCT Application No. PCT/US2021/070384 dated Jul. 9, 2021.

(Continued)

*Primary Examiner* — Jeff A Burke
*Assistant Examiner* — Arslan Azhar
(74) *Attorney, Agent, or Firm* — James A. Joyce; Godfrey & Kahn, S.C.

(57) ABSTRACT

A securement apparatus is provided that includes a robotic arm having a plurality of axes of rotation, one or more position cameras, a controller in communication with the robotic arm to control displacement and articulation of the robotic arm using at least in part, position data received from the one or more position cameras, a mirror gripper positioned at a first end of the robotic arm for engaging a mirror, and an air knife having one or more nozzles for providing an air sheet of forceful air.

12 Claims, 8 Drawing Sheets

(56) References Cited

OTHER PUBLICATIONS

Joulin Vacuum Handling website; https://www.joulin.com/all-industries/standard/flexigrip.html; captured Apr. 14, 2021.
Fanuc America website;https://www.fanucamerica.com/products/robots/series/lr-mate/lr-mate-200id; captured Apr. 14, 2021.
Exair website; https://www.exair.com/index.php/110024.html; captured Apr. 14, 2021.

* cited by examiner

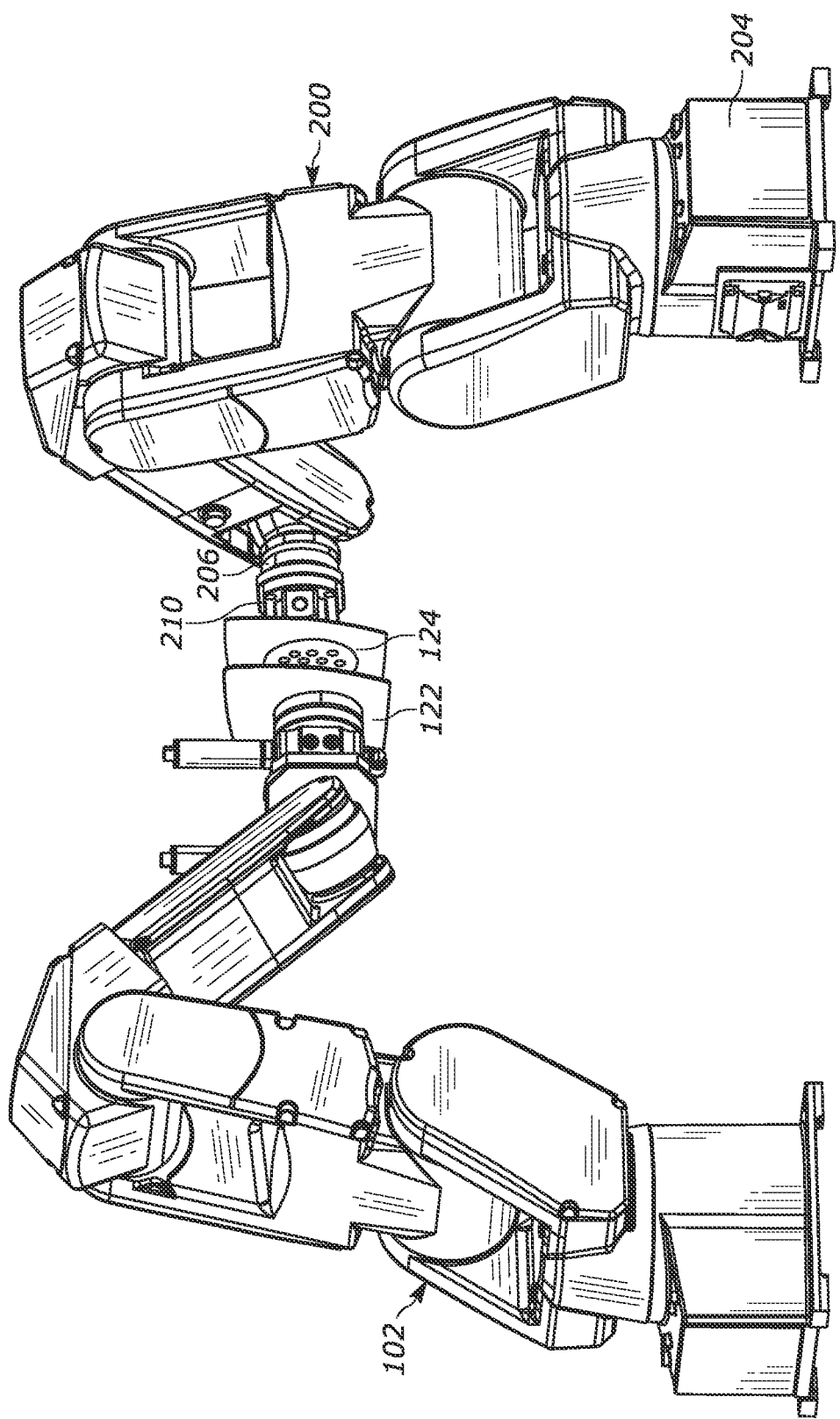

SECUREMENT APPARATUS AND METHOD OF USE

CROSS-REFERENCE TO RELATED APPLICATION

This application claims priority to U.S. Provisional Patent Appl. No. 63/011,434 filed on Apr. 17, 2020, the disclosure of which is incorporated herein by reference in entirety for all purposes.

FIELD OF THE INVENTION

The securement apparatus and method of use relates to the field of automated parts securement apparatuses.

BACKGROUND OF THE INVENTION

Automotive exterior rear view mirrors are utilized to provide a driver a view of objects behind and to the side of the vehicle. These rear view mirrors generally include a glass substrate with a reflective coating. To address issues related to cold weather, such as ice or snow adhering to the mirror, manufactures may secure an electric heater element to the back surface of the mirror. Such heater elements come in various known forms, one such is a single trace of aluminum that winds across a substrate, (e.g., a polyester), where heat is generated from the resistance of the trace when electricity is applied. Another type of heater element is known as a Positive Temperature Coefficient (PTC) heater.

The heater element is generally secured to the glass substrate during the manufacturing process. Due to the inherent properties of the heater element, mounting to the glass substrate has been problematic and labor intensive. Attempts to automate the mounting process have also been problematic.

One such problematic solution has involved the use of a fixture. A fixture is a work-holding or support apparatus used in the manufacturing industry. Fixtures are commonly used to securely locate (position in a specific location or orientation) and support the work, ensuring that all parts produced using the fixture will maintain conformity and interchangeability. Thus far, fixtures have been used unsuccessfully to mount heater elements, with such attempts creating air bubbles that must be removed with a manual squeegee operation. In addition, for convex mirrors, such fixtures have been complicated and expensive to make. Due to various issues, including the aforementioned, hand securement of the heater element on the glass substrate has been the standard, despite requiring additional manual squeegeeing and providing inconsistent securement and marginal results.

BRIEF SUMMARY

In at least some embodiments, a securement apparatus is provided that includes: a robotic arm having a plurality of axes of rotation; one or more position cameras; a controller in communication with the robotic arm to control displacement and articulation of the robotic arm using at least in part, position data received from the one or more position cameras; a mirror gripper positioned at a first end of the robotic arm for engaging a mirror; and an air knife having one or more nozzles for providing an air sheet of forceful air.

In at least some other embodiments a method of securing a heater element to a mirror is provided that includes the following steps: providing: a robotic arm having a plurality of axes of rotation; one or more position cameras; a controller in communication with the robotic arm to control displacement and articulation of the robotic arm using at least in part, position data received from the one or more position cameras; and a mirror gripper positioned at a first end of the robotic arm; then articulating the robotic arm to a first position with the mirror gripper on a mirror having a mirror front surface and a mirror back surface; applying a vacuum force to secure the mirror front surface to the mirror gripper; articulating the robotic arm from the first position with the mirror situated adjacent to a heater element having a heater front surface and a heater back surface; further articulating the robotic arm until the mirror back surface at least partially engages the heater front surface allowing the heater element to be moved coincident with the mirror; providing an air sheet of forceful air; and articulating the robotic arm to pass the mirror and heater element progressively through the air sheet to apply a flow of forceful air along the heater back surface to laminate the heater front surface to the mirror back surface.

In at least some other embodiments a securement apparatus is provided that includes: a robotic arm having a plurality of axes of rotation; one or more position cameras; a controller in communication with the robotic arm to control displacement and articulation of the robotic arm using at least in part position data received from the one or more position cameras; a mirror gripper positioned at a first end of the robotic arm for engaging a mirror; and a heater application fixture having one or more suction ports that provide a vacuum force flow of air.

In at least yet some other embodiments a method of securing a heater element to a mirror is disclosed including, providing: a first robotic arm and a second robotic arm, each having a plurality of axes of rotation; one or more position cameras; a controller in communication with the first robotic arm and a second robotic arm to control displacement and articulation using at least in part, position data received from the one or more position cameras; and a mirror gripper positioned at a first end of the robotic arm; as well as articulating the first robotic arm to a first position with the mirror gripper on a mirror having a mirror front surface and a mirror back surface; applying a vacuum force to secure the mirror front surface to the mirror gripper; articulating the first robotic arm to a second position; coupling a heater element, having a heater front surface and a heater back surface, to the second robotic arm; articulating the second robotic arm until the heater front surface at least partially engages the mirror back surface allowing the heater element to be moved coincident with the mirror; providing an air sheet of forceful air; and articulating the first robotic arm to pass the mirror and heater element progressively through the air sheet to apply a flow of forceful air along the heater back surface to laminate the heater front surface to the mirror back surface.

Other embodiments, aspects, and features of the securement apparatus and method of use will be understood and appreciated upon a full reading of the detailed description and the claims that follow.

BRIEF DESCRIPTION OF THE DRAWINGS

Exemplary embodiments of the securement apparatus and method of use are disclosed with reference to the accompanying drawings and are for illustrative purposes only. The securement apparatus and method of use are not limited in application to the details of construction or the arrangement of the components illustrated in the drawings. The securement apparatus and method of use are capable of other embodiments or of being practiced or carried out in other various ways.

FIG. 11 is a perspective view of an exemplary second robotic arm.

DETAILED DESCRIPTION

Figure 1:
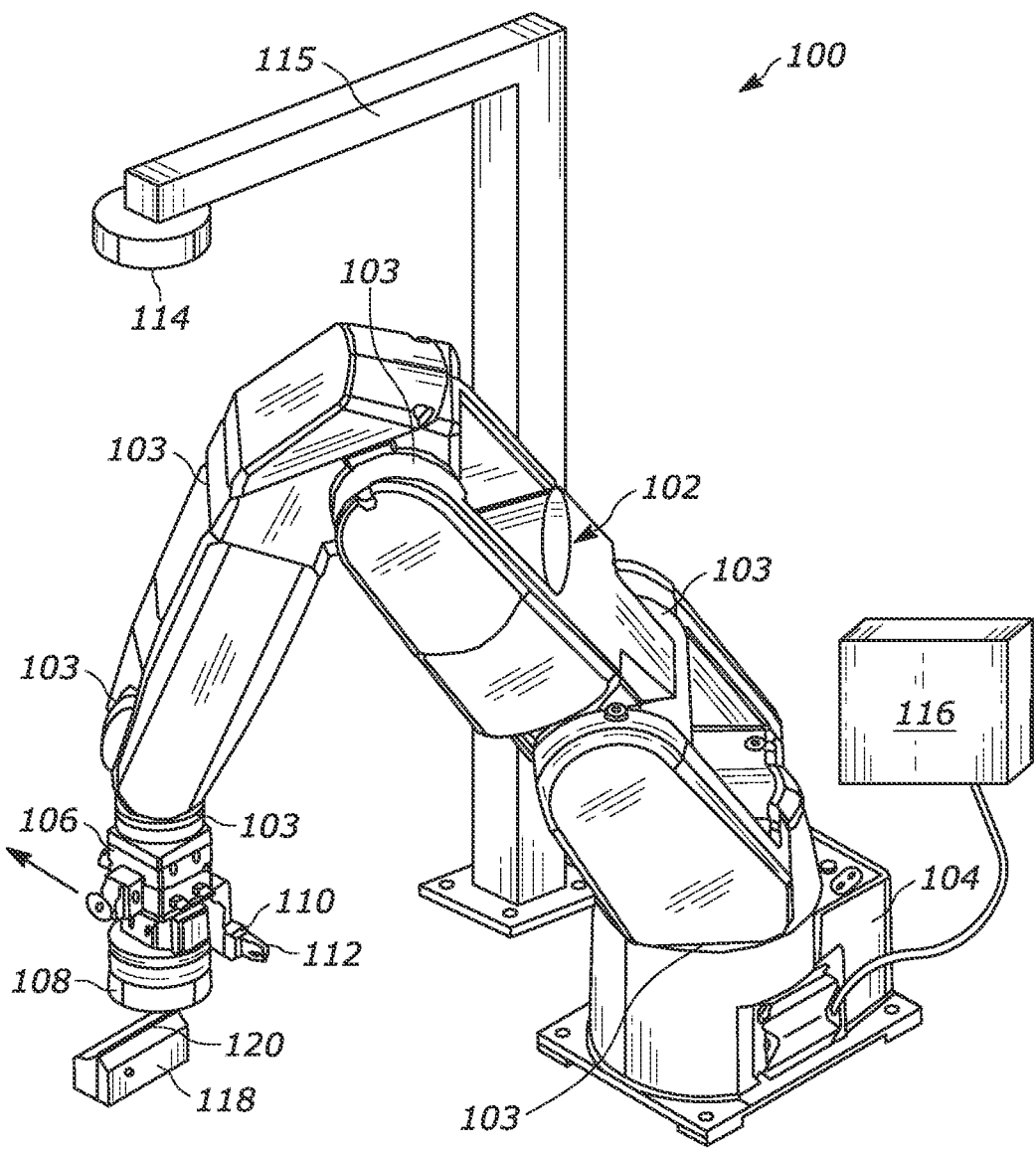
FIG. 1 is a perspective view of an exemplary securement apparatus.
Figure 8:
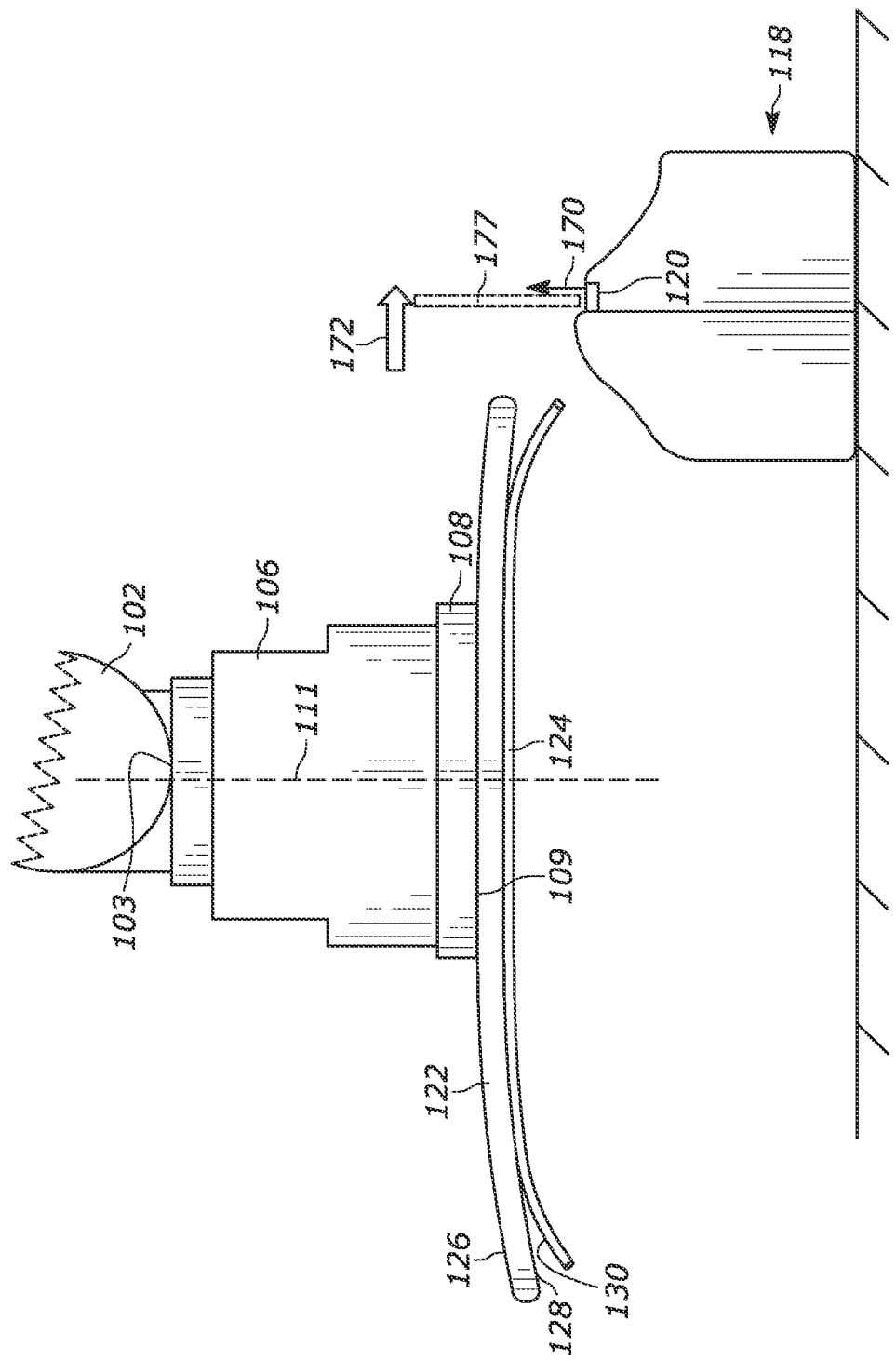
FIG. 8 is a partial side view of the securement apparatus, mirror, and heater element of FIG. 2.

Referring to FIG. 1, an exemplary securement apparatus 100 is illustrated. In at least some embodiments, the securement apparatus 100 includes a robotic arm 102 having a plurality of pivoting joints 103 for providing a plurality of axes (e.g., six axes) of rotation to allow for three dimensional movement in various manners. In at least some embodiments, when the arm 102 is secured to a gripping mechanism, the arm 102 gains the ability to pick up and transfer an object based on user defined paths/commands. The arm 102 includes a base end 104, which can be secured to anchor the arm 102, and a grip end 106 that can include various components for grasping and manipulating objects. In at least some embodiments, the grip end 106 includes a mirror gripper 108 configured for engaging a mirror 122 (see FIG. 2), the grip end 106 and mirror gripper 108 having a central axis 111 extending therethrough. The mirror gripper 108 can utilize any of various types of engagement methods, such as vacuum, etc. to grasp an object. In at least some embodiments, the mirror gripper 108 is a vacuum actuated gripper that includes easily conformable foam portion with a part touching bottom surface 109 (FIG. 8), with the mirror gripper 108 having an array of orifices (not shown) that pass through the bottom surface 109 and in some embodiments, can each contain a check valve, which enables the vacuum to be maintained even when the component being handled is smaller than the gripper. These features allow the gripper to handle numerous shapes, sizes and contours of glass. In at least some embodiments, the bottom surface 109 of the mirror gripper 108 is generally planar, although in other embodiments, the bottom surface 109 can be curved to match the contour of the object it is picking up. In at least some embodiments, the grip end 106 can further include a cover gripper 110 for grasping and peeling off a protective cover sheet (not shown) from an adhesive backed surface of an object, such as a blind spot detection display module and a heater element. The cover gripper 110 can utilize any of various types of engagement methods, such as opposing fingers 112 that are closed onto a portion of the cover sheet.

Further referring to FIG. 1, at least one position camera 114 can be included or otherwise utilized by the securement apparatus 100. The position camera 114 is positioned for viewing the arm 102, as well as other components in order to provide positional data of all the relevant components. The use of position cameras to track movement and position of components is well known and as such all wiring and software utilized to provide tracking information shall be understood to be included as needed. In at least some embodiments, the position camera 114 is a known machine vision camera that when combined with known machine vision software (e.g., iRVision as manufactured by Fanuc American Corp. of Rochester Hills, MI USA), can locate randomly oriented components in a plane based on their X, Y, and R (rotation) coordinates and provide the information as positional data. The camera obtained positional data is provided to a controller 116 to manipulate the arm 102 accordingly. The position camera 114 can be mounted in any of various manners, such as to a camera arm 115 situated adjacent the arm 102.

The securement apparatus 100 further includes the controller 116, which is in communication with the position camera 114 and the arm 102 to control displacement and articulation of the arm 102 using, at least in part, position data received from the position camera and/or associated software. The controller 116 can be comprised of various types of known components commonly used for robotic motor control, such as a Programmable Logic Controller (PLC) and associated known control software (e.g., RSLogix 5000, etc.). The controller 116 accesses program instructions for moving the arm 102 as discussed below. The use of PLCs and control software to position and manipulate a robotic arm are well known, and as such, specific program instructions to effectuate any desired movements are not described in detail herein.

Using program instructions along with the camera positional data, the controller 116 can effectively move an article as desired. Still referring to FIG. 1, the securement apparatus 100 further includes an air knife 118 comprising one or more air nozzles 120 providing a flow of air. Air knives are generally well known and can provide various different air flow outputs, for example a Model 110024 air knife, as manufactured by Exair. In at least some embodiments, the one or more air nozzles 120 are shaped and sized to provide a substantially linear sheet of upwards forceful air (i.e., an air sheet 177)(see FIGS. 8 and 9) generated from the output of the air nozzles 120. The air sheet 177 provides an upward force of air (an air force). Moving an object in a linear path perpendicular (e.g., arrow 172 in FIG. 8) to the air sheet 177 creates a squeegee like effect with the same length as the flow pattern on the surface of that object.

Figure 2:
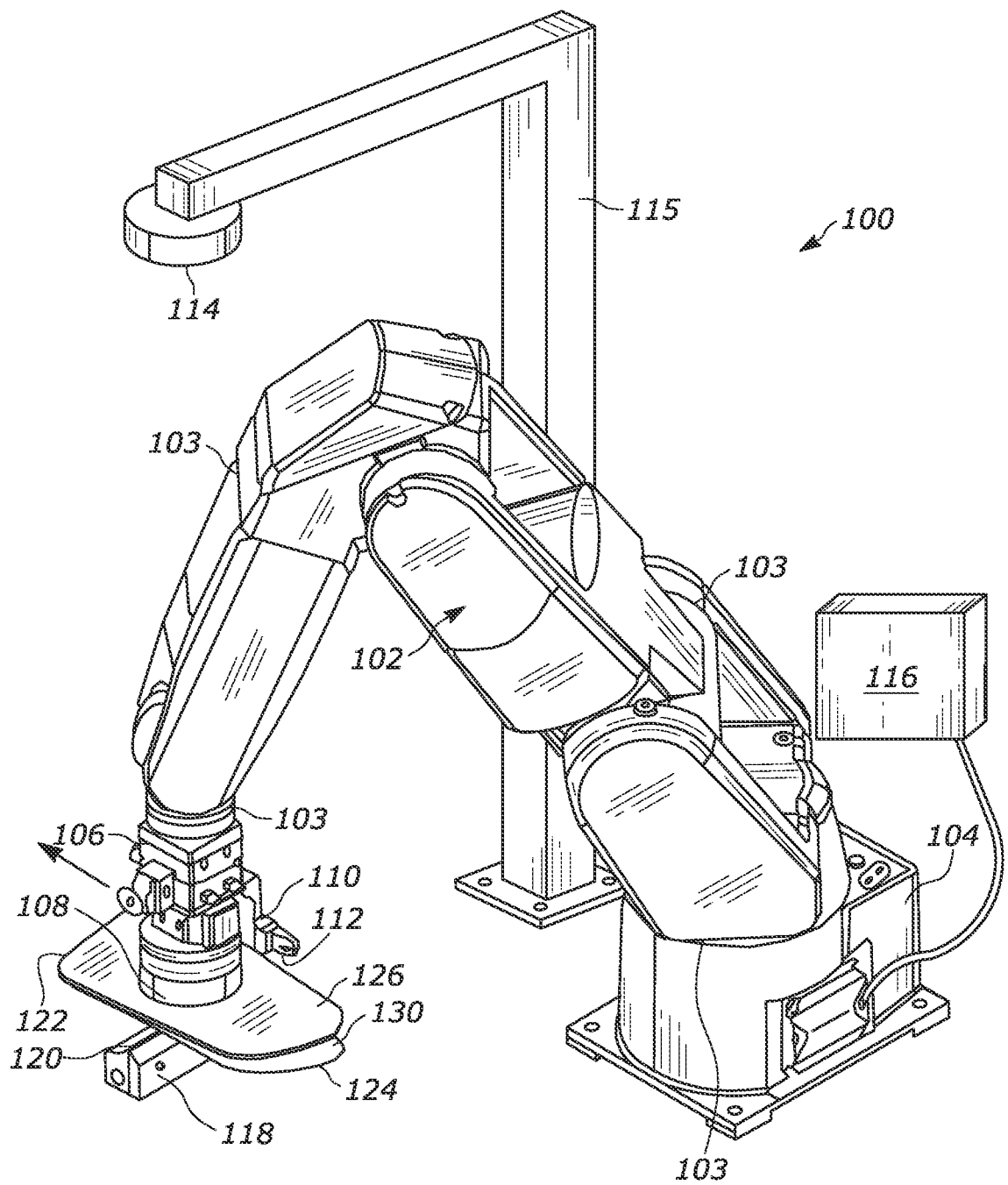
FIG. 2 is a perspective view of the securement apparatus of FIG. 1 along with a mirror and heater element.
Figure 3:
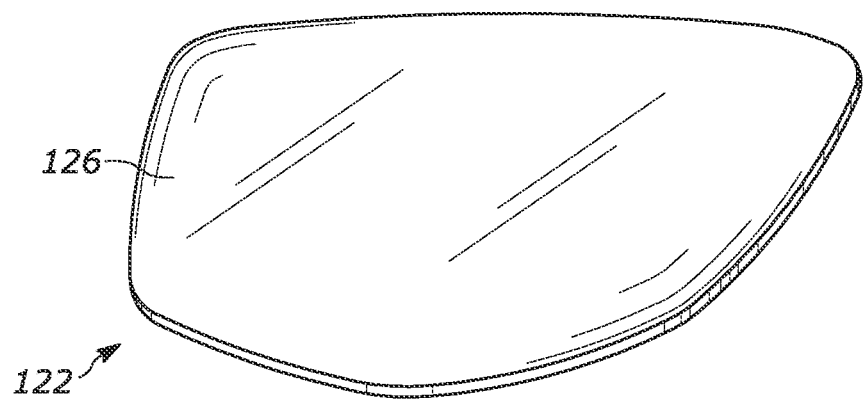
FIG. 3 is a front view of the exemplary mirror of FIG. 2.
Figure 4:
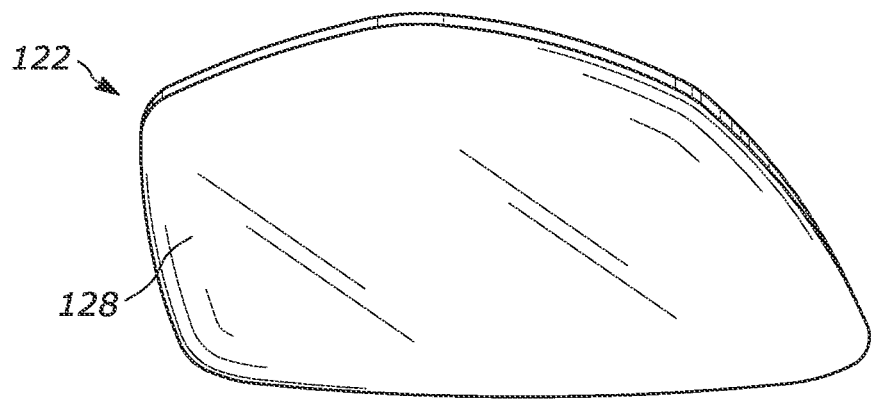
FIG. 4 is a back view of the exemplary mirror of FIG. 2.
Figure 5:
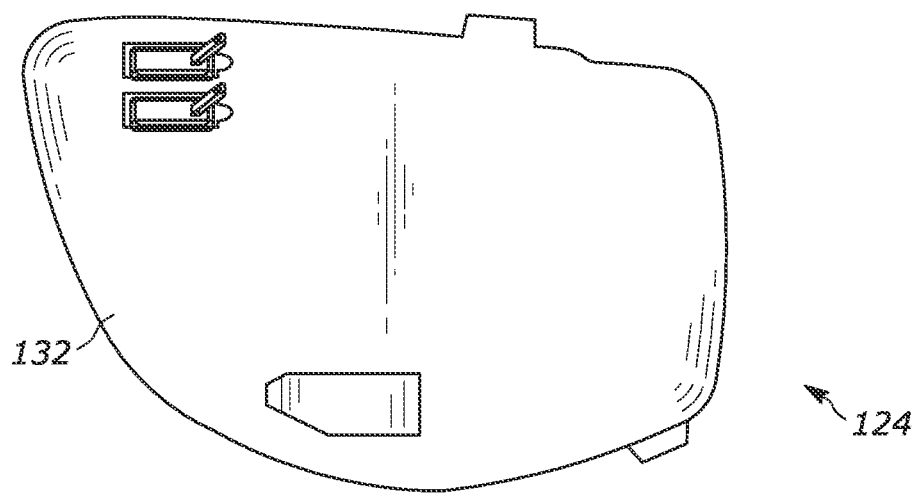
FIG. 5 is a back view of the exemplary heater element of FIG. 2.
Figure 6:
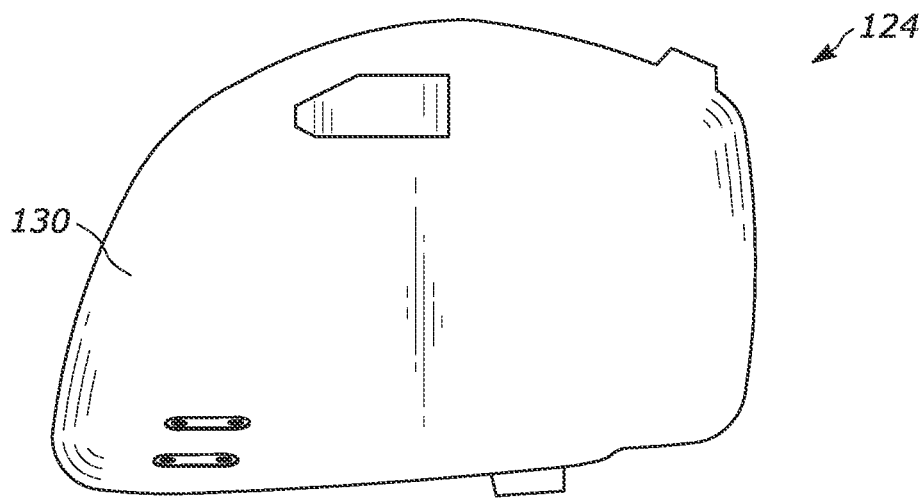
FIG. 6 is a front view of the exemplary heater element of FIG. 2.

Referring to FIG. 2, the securement apparatus 100 is shown with a mirror 122 and an electric heater element 124. The mirror 122 can include various types of substrates used for exterior vehicle rear view mirrors, such as glass, etc., coated to provide a reflection. As shown in FIGS. 3 and 4, the mirror 122 includes a mirror front surface 126 and a mirror back surface 128. As shown in FIGS. 5 and 6, the heater element 124 includes a heater front surface 130 and a heater back surface 132, and is sized and shaped to be secured to the mirror back surface 128. In at least some embodiments, the heater front surface 130 includes a layer of adhesive thereon for securement with the mirror back surface 128, while in other embodiments, the mirror back surface 128 can include the layer of adhesive.

Figure 7:
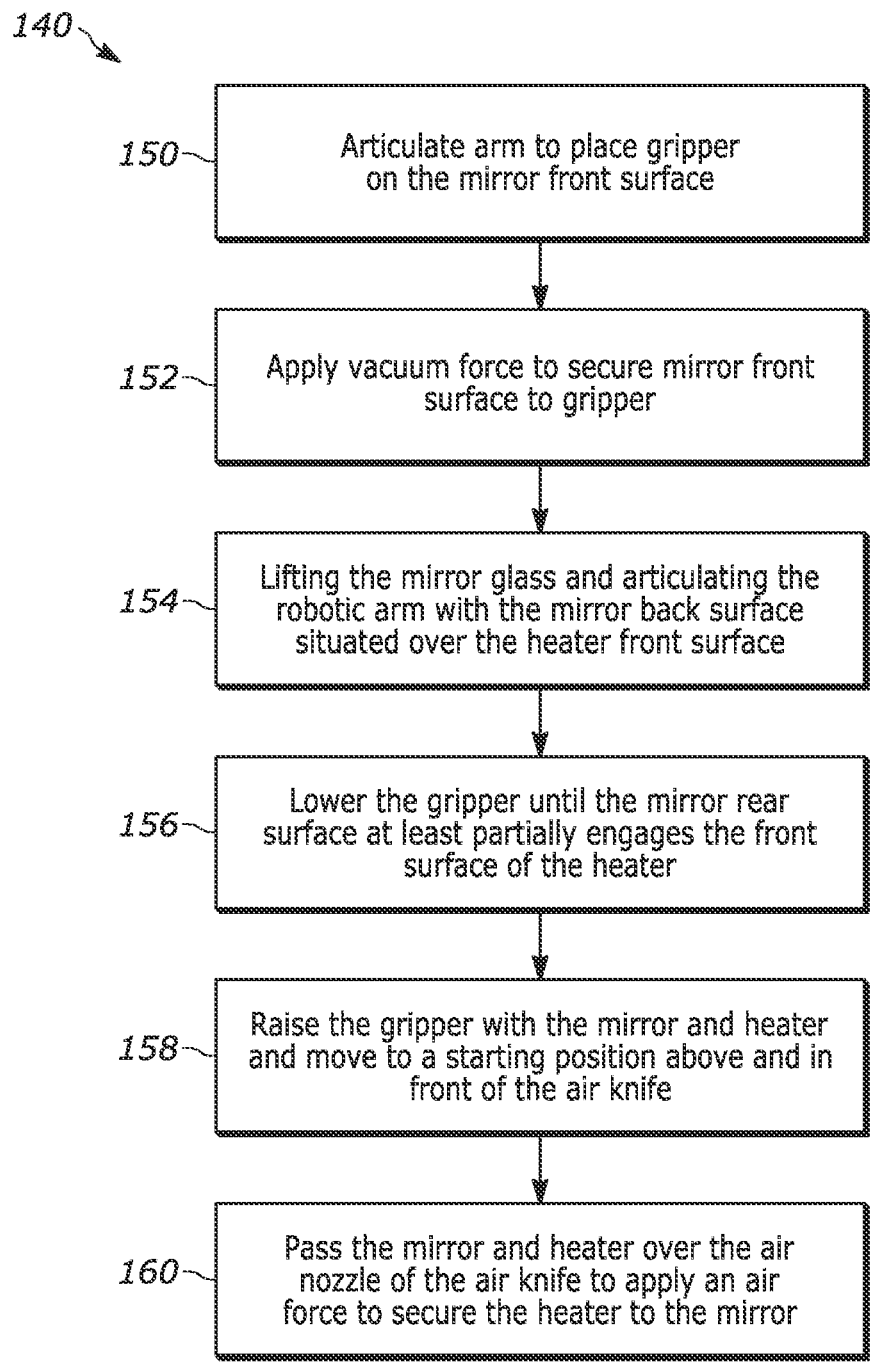
FIG. 7 is an exemplary flow chart providing steps for a method of securing a heater element to a mirror.

Referring to FIG. 7, a flowchart 140 is provided that describes exemplary steps for a method of securing the heater element 124 to the mirror 122. As shown, in step 150, the controller 116 articulates the arm 102 to place the mirror gripper 108 over the mirror front surface 126 with the central axis 111 of the grip end 106 and mirror gripper 108 in a vertical position, and lowers the mirror gripper 108 to engage the mirror front surface 126. In step 152 the mirror gripper 108 temporarily secures the mirror 122 thereto by applying a vacuum force to the mirror 122. In step 154, the controller 116 articulates the arm 102 to lift the mirror 122 and move the mirror gripper 108 from the first position with the mirror back surface 128 situated directly over the heater front surface 130. In step 156, the mirror gripper 108 is lowered until the mirror back surface 128 at least partially engages the heater front surface 130. It is noted that in at least some embodiments as discussed in greater detail below, instead of moving the mirror 122 to the heater element 124 for adhesion, the heater element 124 can be moved by a separate heater robot arm to the mirror 122 on the mirror gripper 108, wherein the heater robot arm engages the heater front surface 130 to the mirror back surface 128 while the mirror 122 remains stationary. In step 158, the mirror gripper 108 is raised and the mirror 122 and heater element 124 are moved to a starting position above and in front of the air knife 118 (see FIG. 8). In step 160, the arm 102 moves the mirror 122 and heater element 124 progressively over the air nozzle 120 of the air knife 118 while the air nozzle 120 ejects forceful air pressure upwards (identified by arrow 170 in FIG. 8), forming the air sheet 177, and against the heater back surface 132. In at least some embodiments, the direction of movement (identified by arrow 172 in FIG. 8) is perpendicular or substantially perpendicular to the air sheet 177 provided by the longitudinally extending air nozzle 120 and the central axis 111 of the grip end 106 and mirror gripper 108 is parallel with the upwards air pressure (i.e. arrow 170). Passing the mirror 122 over the air knife 118 and through the air sheet 177 in this manner allows the emitted air pressure to forcefully push the heater element 124 against the mirror back surface 128 to laminate the components uniformly together. As vehicle mirrors, such as mirror 122 are typically convex in shape, adhering the planar and flexible heater element 124 to the mirror back surface 128 is accomplished easily by the force of the air sheet 177, which adapts to the convex shape. In at least some embodiments, the air knife 118 can instead be moved while the mirror gripper 108 remains stationary.

Figure 9:
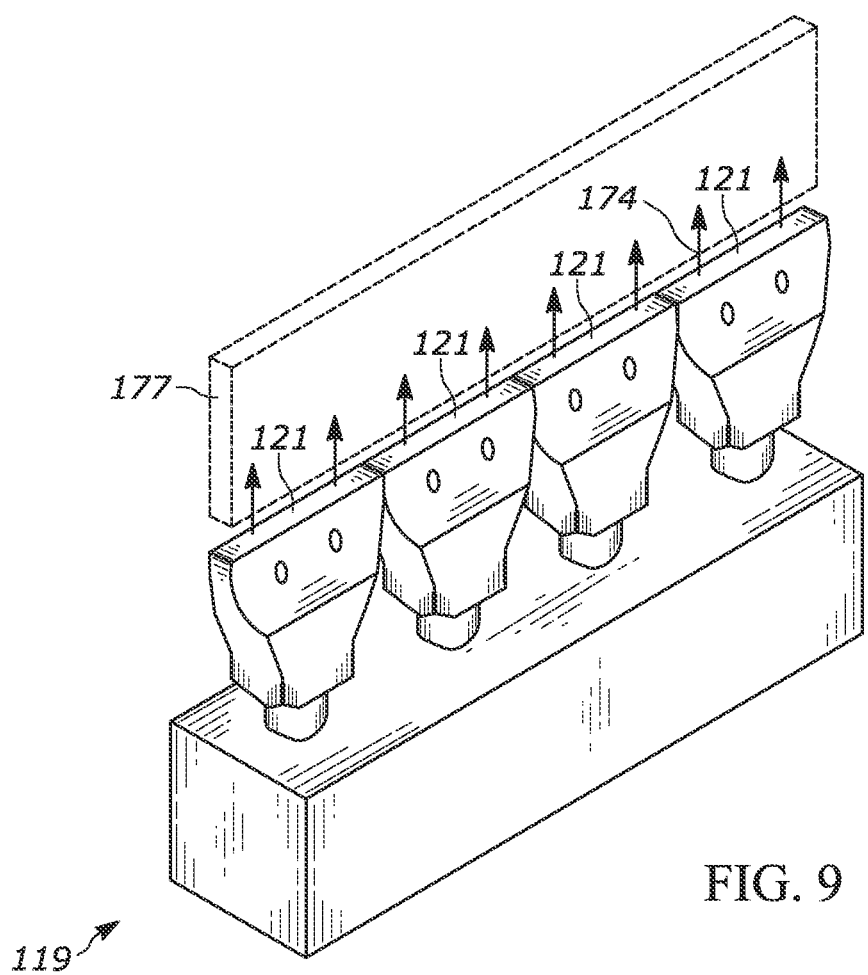
FIG. 9 is a second exemplary embodiment of the air knife.

Referring to FIG. 9, another exemplary embodiment of the air knife, air knife 119 is illustrated that utilizes multiple air nozzles 121, rather than a single elongated nozzle, the air nozzles 121 are shaped and positioned to provide a similar generally longitudinally linear upward air force illustrated by arrows 174 to produce the air sheet 177.

Figure 10:
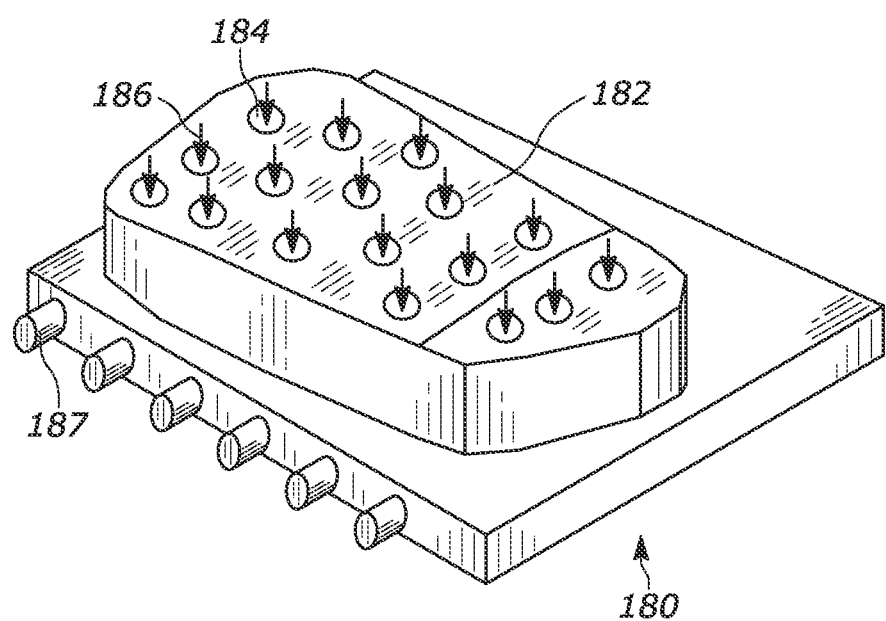
FIG. 10 is an exemplary heater application fixture.

Referring to FIG. 10, in at least some embodiments, the securement apparatus 100 can include a heater application fixture 180 instead of the air knife 118. The heater application fixture 180 provides a surface 182 having a contour that is similar to the contour of the mirror back surface 128, and a plurality of suction ports (i.e. suction cups) 184 that provide a vacuum force (illustrated by arrows 186) to hold and form the heater element 124 to surface 182. Vacuum lines 187 are coupled to the suction ports 184 to provide a source of switchable vacuum. With the heater application fixture 180, instead of passing the mirror 122 and heater element 124 progressively over air nozzles, the arm 102 lowers the mirror 122 on to the heater element 124, which has already been placed on the surface 182 with its adhesive exposed. Vacuum at the suction ports 184, forcefully pulls/holds the heater element 124 to the surface 182 while the arm 102 pushes the mirror 122 down against the heater element 124 to laminate the components together.

As noted above, in at least some embodiments, the securement apparatus 100 can include a second robotic arm 200, having a plurality of pivoting joints 203 for providing a plurality of axes of rotation to allow for three dimensional movement in various manners. The second robotic arm 200 is similar to arm 102 and includes a gripping mechanism with the ability to pick up and transfer an object based on user defined paths/commands. The second robotic arm 200 can include a base end 204, which can be secured to anchor the second robotic arm 200, and a grip end 206 that can include various components for grasping and manipulating objects. In at least some embodiments, the grip end 206 includes a heater element gripper 210 configured for engaging the heater element 124. The second robotic arm 200 can be utilized to pick up the heater element 124 and position it for engagement with the mirror 122. More particularly, rather than have the arm 102 articulate to engage the mirror 122 with the heater element 124 resting on a horizontal surface, the heater element 124 can be picked up and articulated by the second robotic arm 200 to engage the mirror 122 that is being held stationary by the arm 102. In this manner, steps 154 and 156 described above would be replaced with, articulating the arm 102 to a second position; coupling the heater element 124, having the heater front surface 130 and a heater back surface 132 to the second robotic arm 200; articulating the second robotic arm 200 until the heater front surface 130 at least partially engages the mirror back surface 128 allowing the heater element 124 to be moved coincident with the mirror.

It is specifically intended that the securement apparatus and method of use is not to be limited to the embodiments and illustrations contained herein, but include modified forms of those embodiments including portions of the embodiments and combinations of elements of different embodiments as come within the scope of the following claims. Further, the steps described herein with reference to the method of use (processes) are not to be considered limiting and can include variations, such as additional steps, removed steps, and re-ordered steps. The specific materials, shapes, and sizes of components can vary. The use of the term "plurality" in the description or claims shall be understood to include "one or more."

While the invention is particularly useful in automotive mirror assemblies, other applications are possible and references to use in a mirror assembly should not be deemed to limit the application of the invention. Rather, the invention may be advantageously adapted for use where similar performance capabilities and characteristics are desired, and that such modifications may be made by one of skill in the art of the invention without departing from the spirit or intent of the invention and therefore, the invention is to be taken as including all reasonable equivalents to the subject matter.

What is claimed is:

1. A securement apparatus comprising:
a first robotic arm having a plurality of axes of rotation;
one or more position cameras;
a programmable logic controller in communication with the first robotic arm to control displacement and articulation of the first robotic arm using at least in part, position data received from the one or more position cameras;
a mirror gripper positioned at a first end of the first robotic arm for engaging a mirror, wherein the mirror gripper is a vacuum actuated gripper comprising a foam portion with an array of vacuum orifices that directly contact a top surface of the mirror;
an air knife having one or more nozzles for outputting an air sheet of forceful air; and a second robotic arm having a plurality of axes of rotation, wherein the programmable logic controller is in communication with the second robotic arm to control displacement and articulation of the second robotic arm, and wherein the second robotic arm positions a heater element for engagement with the mirror engaged to the mirror gripper of the first robotic arm.

2. The apparatus of claim 1, further comprising a cover gripper extending from the first robotic arm.

3. The apparatus of claim 2, wherein the cover gripper compromises opposing closable fingers.

4. The apparatus of claim 1, wherein the one or more nozzles of the air knife are positioned such that the air sheet provides a substantially linear flow of air directed substantially vertically.

5. The apparatus of claim 1, wherein at least one of the one or more position cameras is stationary and positioned adjacent to the first robotic arm.

6. The apparatus of claim 1, wherein the one or more nozzles of the air knife are positioned such that the air sheet extends vertically and parallel to a central axis of the mirror gripper.

7. The apparatus of claim 6, wherein the first robotic arm includes at least six axes of rotation.

8. The apparatus of claim 7, wherein the first robotic arm includes at least two vertical axes of rotation and four horizontal axes of rotation.

9. A method of securing a heater element to a mirror comprising:
providing:
   a robotic arm having a plurality of axes of rotation;
   one or more position cameras;
   a controller in communication with the robotic arm to control displacement and articulation of the robotic arm using at least in part, position data received from the one or more position cameras; and
   a mirror gripper positioned at a first end of the robotic arm;
articulating the robotic arm to a first position with the mirror gripper on a mirror having a mirror front surface and a mirror back surface;
applying a vacuum force to secure the mirror front surface to the mirror gripper;
articulating the robotic arm from the first position with the mirror situated adjacent to a heater element having a heater front surface and a heater back surface;
further articulating the robotic arm until the mirror back surface at least partially engages the heater front surface allowing the heater element to be moved coincident with the mirror;
providing an air sheet of forceful air; and
articulating the robotic arm to pass the mirror and heater element progressively through the air sheet to apply a flow of forceful air along the heater back surface to laminate the heater front surface to the mirror back surface.

10. The method of claim 9, wherein the robotic arm moves substantially perpendicular to the air sheet while passing the mirror and heater element therethrough.

11. The method of claim 10, wherein the air sheet is provided by one or more nozzles of an air knife that are positioned such that the air sheet extends vertically.

12. A method of securing a heater element to a mirror comprising:
providing:
   a first robotic arm and a second robotic arm, each having a plurality of axes of rotation;
   one or more position cameras;
   a controller in communication with the first robotic arm and a second robotic arm to control displacement and articulation using at least in part, position data received from the one or more position cameras; and
   a mirror gripper positioned at a first end of the robotic arm;
articulating the first robotic arm to a first position with the mirror gripper on a mirror having a mirror front surface and a mirror back surface;
applying a vacuum force to secure the mirror front surface to the mirror gripper;
articulating the first robotic arm to a second position;
coupling a heater element, having a heater front surface and a heater back surface, to the second robotic arm;
articulating the second robotic arm until the heater front surface at least partially engages the mirror back surface allowing the heater element to be moved coincident with the mirror;
providing an air sheet of forceful air; and
articulating the first robotic arm to pass the mirror and heater element progressively through the air sheet to apply a flow of forceful air along the heater back surface to laminate the heater front surface to the mirror back surface.

\* \* \* \* \*